No. 699,154. Patented May 6, 1902.
M. A. DE FORCE.
FLOWER STAND.
(Application filed Aug. 26, 1901.)
(No Model.)
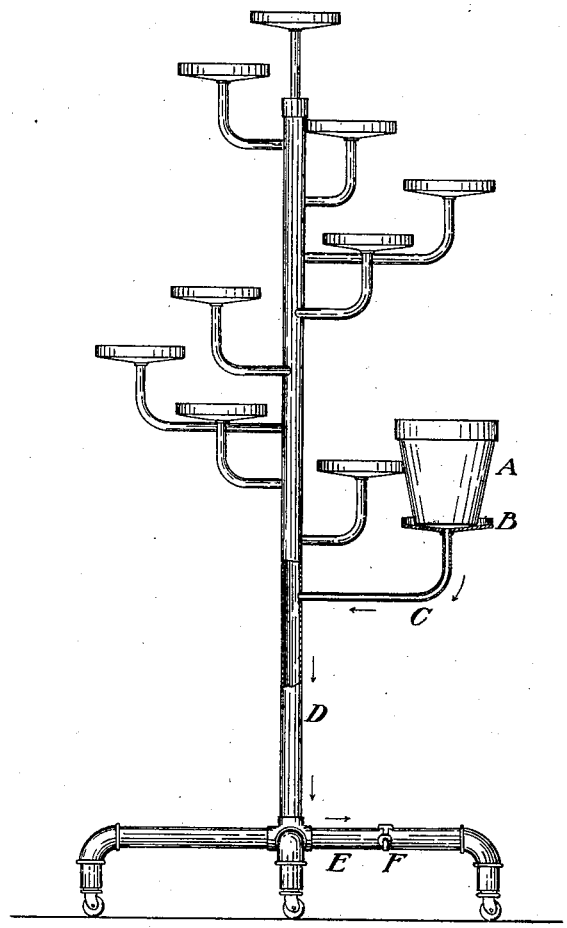
WITNESSES: Mary A. De Force INVENTOR
BY
George A. Williams ATTORNEY

UNITED STATES PATENT OFFICE.

MARY A. DE FORCE, OF CORRY, PENNSYLVANIA, ASSIGNOR OF TWO-THIRDS TO DENNIS PIERCE AND GEORGE A. WILLIAMS, OF JAMESTOWN, NEW YORK.

FLOWER-STAND.

SPECIFICATION forming part of Letters Patent No. 699,154, dated May 6, 1902.

Application filed August 26, 1901. Serial No. 73,402. (No model.)

*To all whom it may concern:*

Be it known that I, MARY A. DE FORCE, a citizen of the United States, and a resident of Corry, in the county of Erie and State of Pennsylvania, have invented a new and useful Flower-Stand, of which the following is a specification.

My invention relates to stands for holding flowers or plants in dwellings where care must be exercised to prevent inconvenience or damage from the overflow or drainage consequent upon watering the flowers; and the object of my improvement is, first, to make a strong and neat stand of pipe and couplings which can stand anywhere in the room; second, to make a receptacle of the pipe itself for the overflow, and, third, to provide means whereby the surplus water confined in the pipe of the stand may be controlled and drawn off as desired. I attain these objects by mechanism as shown in the accompanying drawing, which gives an elevation of one pattern of my stand as made from common pipe and couplings and having part of the pipe broken away to show the drainage, the course of which is indicated by arrows.

A is a common flower-pot with a drainage-opening in the bottom.

B is a cup for holding the pot. Cup B has an opening therein and is so attached to pipe-arm C as to drain into arm C. Arm C enters upright or large central pipe D. Upright pipe D may have a number of arms, like C, draining into it, or there may be a number of uprights D. At its base upright D is united by a common three or four way coupling to a pipe-base formed of a sufficient number of projections or feet E to support the stand, which I have shown supported upon casters for ease in moving about.

It will be seen that upright D and base E in a good-sized stand would have a capacity of a gallon or two, which would suffice for the overflow of the plants for a day or two. Accordingly no other receptacle for the drainage is necessary, and the appearance of the stand is thus greatly enhanced, as well as quite a reduction attained in the cost of manufacture. I therefore use the stand itself to hold the overflow in the pipes, and they will hold the water until the level of the lowest plant is reached.

In order that the stand may be moved about the house freely on its casters, my stand must be strong and substantial without fear of leakage from the strain of moving. I therefore make my stand of common galvanized water-pipe and couplings with threaded joints, which are easily made water-tight and control the discharge of the water in the pipe until such time as I desire to empty the same by a stop-cock or faucet F, placed in the pipe at or near its lowest point of drainage in order to empty all the water from the stand.

It will be recognized that my stand is exceptionally strong to bear the heavy weight of the potted plants, as well as the water in the stand. It is also a cheap and durable stand easy to manufacture.

I claim as new—

1. In a flower-stand, a complete stand made of pipe and suitable couplings therefor, flower-pot cups on said pipe having openings into said pipe as a receptacle for drainage, and means for controlling the confinement and discharge of said drainage as desired, substantially as shown and described.

2. In a flower-stand, a complete movable stand made of pipe and suitable couplings therefor, cups on said pipe having openings for drainage into said pipe as a temporary receptacle, a stop-cock or faucet secured in said pipe near its lower part to confine or empty said drainage as desired, and wheels or casters on said stand for moving it about, substantially as shown and for the purpose specified.

In testimony whereof I have signed my name to this specification in the presence of two subscribing witnesses.

MARY A. DE FORCE.

Witnesses:
GEORGE A. WILLIAMS,
AUSTIN H. STAFFORD.